(12) United States Patent
Chen et al.

(10) Patent No.: US 9,082,298 B2
(45) Date of Patent: Jul. 14, 2015

(54) REMOTE CONTROL APPARATUS PROVIDING INFRARED CONTROL

(71) Applicants: Yi Hsiang Chen, New Taipei (TW); Yi Hsuan Chen, New Taipei (TW)

(72) Inventors: Yi Hsiang Chen, New Taipei (TW); Yi Hsuan Chen, New Taipei (TW)

(73) Assignee: Aengin, Inc., New Taipei (TW)

( * ) Notice: Subject to any disclaimer, the term of this patent is extended or adjusted under 35 U.S.C. 154(b) by 11 days.

(21) Appl. No.: 13/959,805

(22) Filed: Aug. 6, 2013

(65) Prior Publication Data

US 2015/0043921 A1  Feb. 12, 2015

(51) Int. Cl.
*H04B 10/00* (2013.01)
*G08C 23/04* (2006.01)
*H04B 10/114* (2013.01)
*H04B 13/02* (2006.01)

(52) U.S. Cl.
CPC ............ *G08C 23/04* (2013.01); *H04B 10/1141* (2013.01)

(58) Field of Classification Search
CPC ... H04B 10/11; H04B 10/114; H04B 10/1141
USPC .................................................. 398/106, 114
See application file for complete search history.

(56) References Cited

U.S. PATENT DOCUMENTS

| | | | |
|---|---|---|---|
| 2007/0290885 A1* | 12/2007 | Tanabe et al. | 340/825.72 |
| 2009/0239587 A1* | 9/2009 | Negron et al. | 455/566 |
| 2013/0156434 A1* | 6/2013 | Hsieh et al. | 398/106 |
| 2013/0156435 A1* | 6/2013 | Hsieh et al. | 398/106 |

* cited by examiner

*Primary Examiner* — Daniel Dobson
(74) *Attorney, Agent, or Firm* — Alan D. Kamrath; Kamrath IP Lawfirm, P.A.

(57) ABSTRACT

A remote control apparatus includes a wireless module, a microprocessing module, an infrared module, a power supply module, and a housing. The wireless module, the microprocessing module, and the infrared module are electrically connected to each other in series. The power supply module is electrically connected to and supplies electricity to the wireless module, the microprocessing module, and the infrared module. The housing is located in a position outside of an electric appliance and corresponding to an infrared reception end of the electric appliance. The wireless module is connected to a handheld device for receiving a wireless control signal from the handheld device. The microprocessing module unit converts the remote control signal from the wireless module into an enabling signal. The infrared module transmits an infrared control signal to the infrared reception end of the electric appliance upon reception of the enabling signal from the microprocessing module.

9 Claims, 7 Drawing Sheets

A-A'

REMOTE CONTROL APPARATUS PROVIDING INFRARED CONTROL

BACKGROUND OF THE INVENTION

The present invention relates to a remote control apparatus for an electric appliance and, more particularly, to a remote control apparatus providing infrared control to control power supply to an electric appliance through a wireless transmission technique.

Use of various electric appliances becomes more frequent as a result of development of techniques. Use of more electric appliances is followed by use of more remote controllers for controlling ON/OFF and functions of the electric appliances. Research of equipment providing control through networks is conducted, while the electric products, such as touch screen mobile phones, perform more and more functions. However, most home electric appliances are still controlled by infrared control, which is the cheapest way and provides easy operation for less complicated electric appliances. As a result, more and more electric appliances are equipped with an infrared remote controller.

A user in a home or in an office is troubled with the increasing number of infrared controlled products, because most of the infrared remote controllers are not compatible to each other even if having similar outlines that cause difficulties in identification if placed together. Another disadvantage of infrared control is that the infrared remote controller must be directed to a control point on the electric appliance within an operating range without any obstacle between the control point and the infrared remote controller. Control is poor or even impossible if the battery of the infrared remote control is low, the infrared remote controller is too far away from the control point, or an obstacle exists between the infrared remote controller and the control point.

For saving energy and reducing carbon emission, it still takes time to set the timing function by operating the infrared remote controllers on the site, even though some of the products, such as air conditioners or televisions, have a timer. If the user forgot to set or if the user left without turning the electric appliance off, the user has to spend time going back to turn off the power, leading to inconvenience as well as electricity waste. These situations are not uncommon to many users. Despite these disadvantages, infrared remote control is still the economic way of wireless control and is the most common accessory for electric appliances. Furthermore, long range control techniques, such as WiFi (wireless fidelity), can not be widely used on electric products. The large number of current infrared controlled products can not be replaced by other technical solutions. It is, thus, an important issue to provide consumers with easy-to-install relay type long-range remote control devices directly suitable for current infrared remote controlled products.

To solve the above problems, a remote control device with both infrared and Bluetooth interfaces has been provided. The remote control device includes a plurality of infrared emitting ends corresponding to infrared reception ends on electric appliances. The Bluetooth interface of the remote control device can be connected with a Bluetooth interface of a handheld device. A Bluetooth control signal sent out by the handheld device can be converted by the remote control device into an infrared control signal that is sent out by the infrared emitting end to control one or more of the electric appliances. The remote control device is designed to control many electric appliances at a time and is, thus, placed in a central area among the electric appliances. Such a spatial design does not allow each infrared emitting end to be directed towards the infrared reception end of the corresponding electric appliance. Furthermore, the control signal could be weak or poor because of the distance and obstacles between the remote control device and the electric appliances.

BRIEF SUMMARY OF THE INVENTION

A remote control apparatus for providing infrared remote control through a wireless signal according to the present invention includes a wireless module, a microprocessing module, an infrared module, a power supply module, and a housing receiving the wireless module, the microprocessing module, and the infrared module. The wireless module, the microprocessing module, and the infrared module are electrically connected to each other in series. The power supply module is electrically connected to and supplies electricity to the wireless module, the microprocessing module, and the infrared module. The housing is adapted to be located in a position outside of an electric appliance and corresponding to an infrared reception end of the electric appliance. The wireless module is adapted to be connected to a handheld device and adapted to receive a wireless control signal from the handheld device. The wireless module transmits the wireless control signal to the microprocessing module. The microprocessing module unit converts the remote control signal into an enabling signal and sends the enabling signal to the infrared module. The infrared module transmits an infrared control signal to the infrared reception end of the electric appliance upon reception of the enabling signal.

Preferably, the wireless module is a Bluetooth module or wireless fidelity module.

Preferably, the power supply module is a battery or receives power from an external power source.

Preferably, the housing includes an end having a transmitting portion. The transmitting portion includes an opening in which the infrared module is mounted.

Preferably, the infrared module includes a plurality of infrared LEDs.

In an embodiment, the housing includes a fixing portion. The housing is adapted to be fixed to the electric appliance by the fixing portion. The housing is aligned with the infrared reception end of the electric appliance.

In another embodiment, the housing is pivotably mounted to a fixing portion by a pivot. The fixing portion is adapted to be fixed to the electric appliance, such that the housing is pivotable relative to the infrared reception end of the electric appliance.

In a further embodiment, the housing further includes a transmission portion opposite to the transmitting portion. The housing includes a reflective plate located between the transmitting portion and the transmission portion.

In another embodiment, a plurality of infrared modules is provided, and the microprocessing module includes a plurality of connections located on the housing. Each connection is connected to one of the infrared modules.

The present invention will become clearer in light of the following detailed description of illustrative embodiments of this invention described in connection with the drawings.

DETAILED DESCRIPTION OF THE INVENTION

Figure 1:
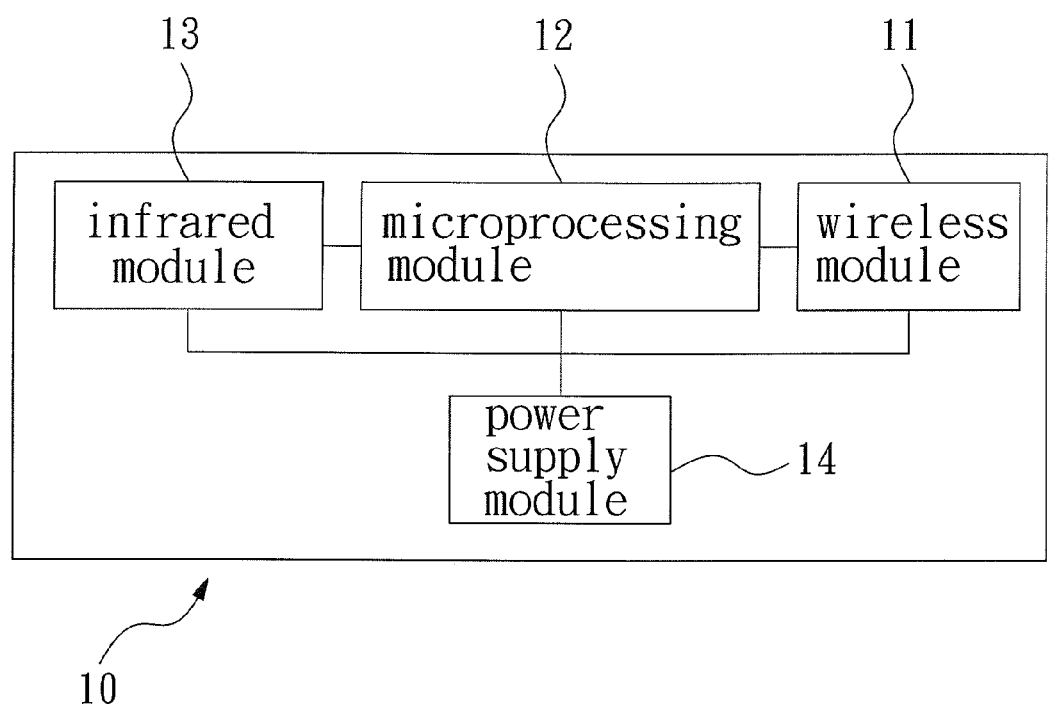
FIG. 1 is a schematic block diagram of a remote control apparatus according to the present invention.
Figure 2:
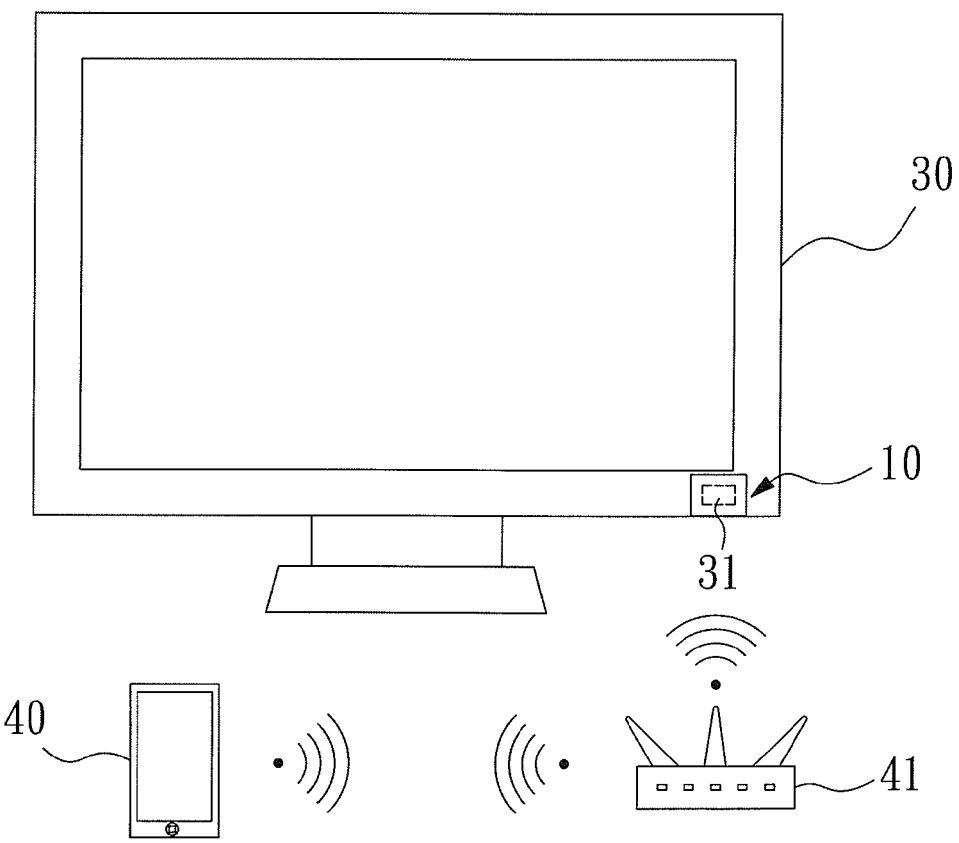
FIG. 2 is a schematic view illustrating operation of the remote control apparatus according to the present invention.
Figure 3:
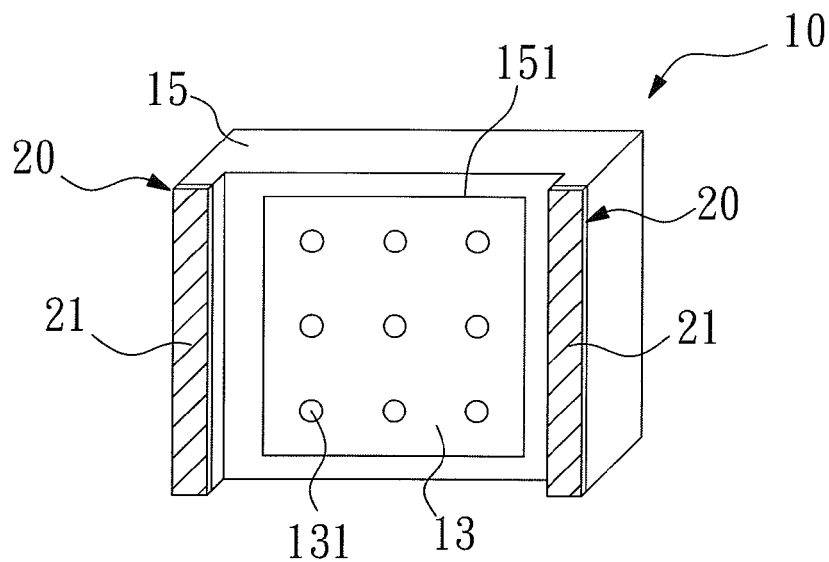
FIG. 3 is a perspective view of a first embodiment of the remote control apparatus according to the present invention.

With reference to FIGS. 1-3, a first embodiment of a remote control apparatus for providing infrared remote control through a wireless signal according to the present invention is designated 10 and includes a wireless module 11, a microprocessing module 12, an infrared module 13, and a power supply module 14. The wireless module 11, the microprocessing module 12, and the infrared module 13 are electrically connected to each other in series and then fixed in a housing 15. The power supply module 14 is electrically connected to and supplies electricity to the wireless module 11, the microprocessing module 12, and the infrared module 13.

The wireless module 11 can be a Bluetooth module or WiFi (wireless fidelity) module for connection with a Bluetooth module or WiFi module of a handheld device 40, such as a mobile phone. The wireless module 11 receives a wireless control signal directly sent from the handheld device 40 or transmitted through a long-range network transmission and a wireless network station 41. After receiving the wireless control signal, the wireless module 11 transmits the wireless control signal to the microprocessing module 12 that coverts the wireless control signal into a control signal for a corresponding electric appliance 30 after operation. Then, the microprocessing module 12 sends the control signal to the infrared module 13. In this embodiment, the infrared module 13 includes a plurality of infrared LEDs 131. The infrared module 13 receives the control signal from the microprocessing module 12 and transmits the control signal through the infrared LEDs 131 to the infrared reception end 31 of the electric appliance 30 to control the electric appliance 30. The power supply module 14 can be a battery or can receive power from an external power source.

The wireless module 11, the microprocessing module 12, the infrared module 13, and the power supply module 14 are fixed in the housing 15. The housing 15 includes an end having a transmitting portion 151 with an opening. The infrared module 13 is mounted in the opening and can send out infrared rays through the transmitting portion 151. The housing 15 includes a fixing portion 20. In this embodiment, the fixing portion 20 is fixed by an adhesive tape 21 to the electric appliance 30 at a location in which the housing 15 is aligned with the infrared reception end 31 of the electric appliance 30. Thus, the transmitting portion 151 is close to the infrared reception end 31 to reliably receive the infrared control signal. A most convenient but best controlling effect is obtained through operation of the handheld device 40 via the WiFi module or Bluetooth module. Furthermore, the fixing portion 20 can be fixed by screws or the like or by snap-fit, fixing the housing 15 to the electric appliance 30.

Figure 4:
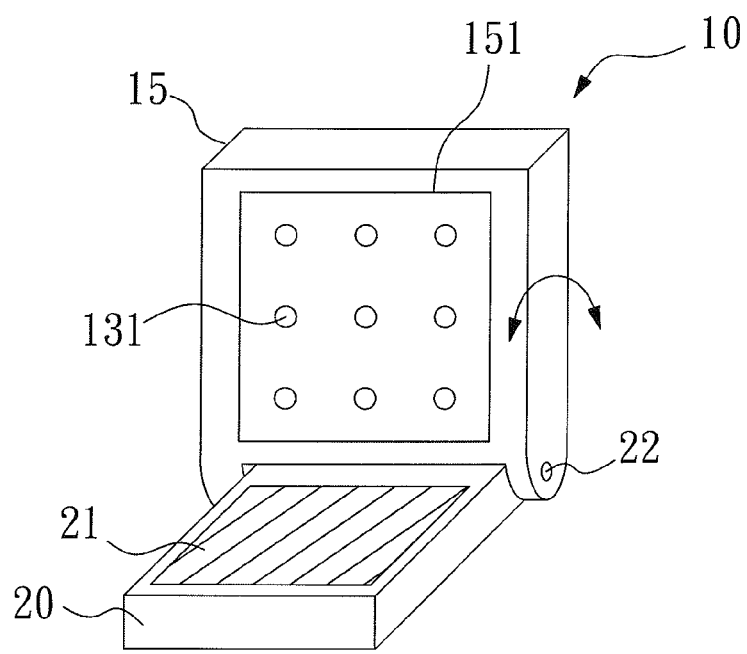
FIG. 4 is a perspective view of a second embodiment of the remote control apparatus according to the present invention.
Figure 5:
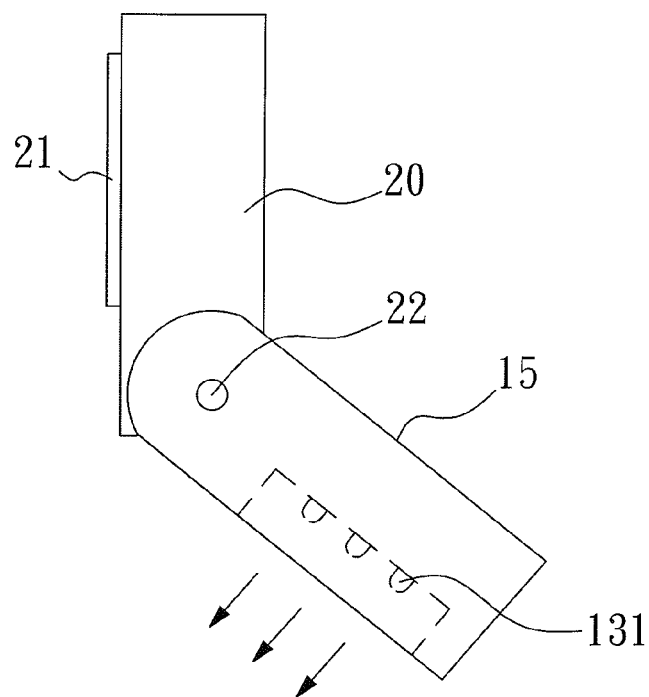
FIG. 5 is a top view of the remote control apparatus of FIG. 4.
Figure 6:
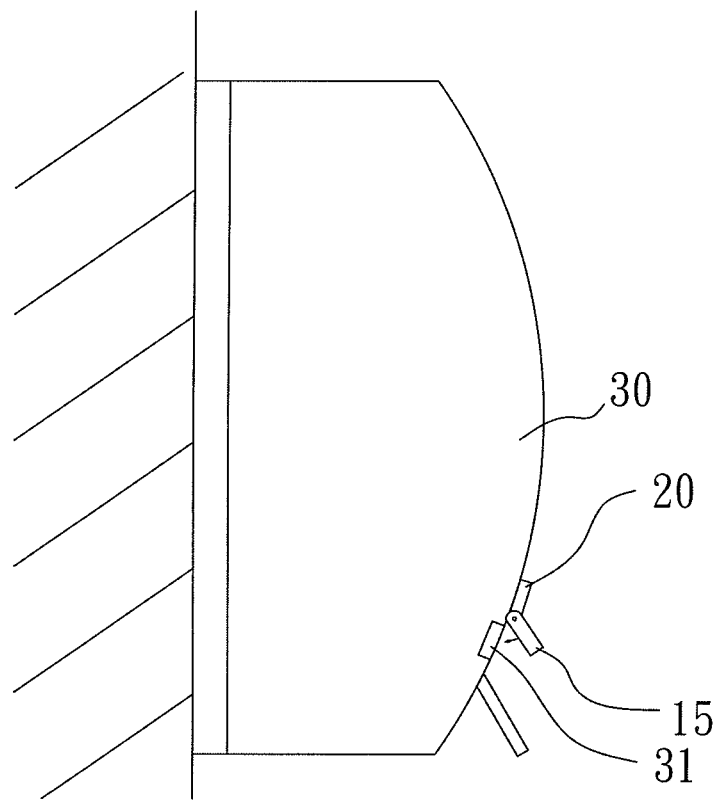
FIG. 6 is a schematic view illustrating operation of the remote control device of FIG. 4.
Figure 6:
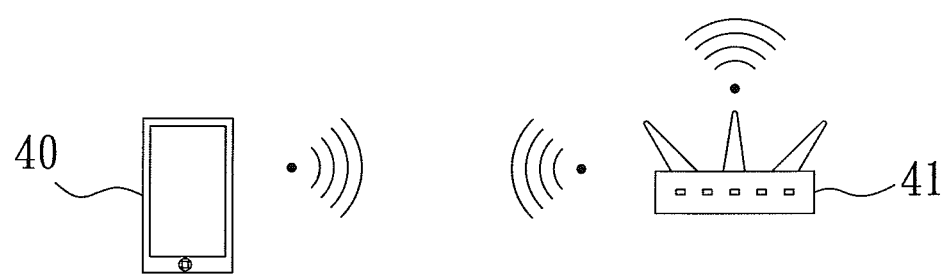

FIGS. 4-6 show a second embodiment of the present invention. The housing 15 is pivotably mounted to the fixing portion 20 by a pivot 22. Thus, the housing 15 is pivotable relative to the infrared reception end 31 of the electric appliance 30 after the fixing portion 20 is fixed by the adhesive tape 21 to the electric appliance 30. This allows the transmitting portion 151 to be pivoted to an optimal position (optimal transmission angle and optimal distance) relative to the infrared reception end 31, achieving the best control effect.

Figure 7:
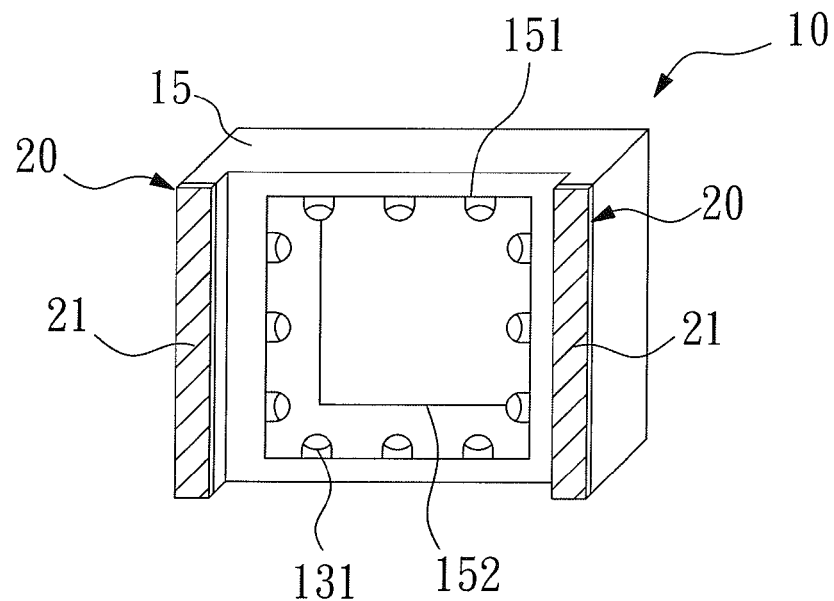
FIG. 7 is a perspective view of a first example of a third embodiment of the remote control device according to the present invention.
Figure 8:
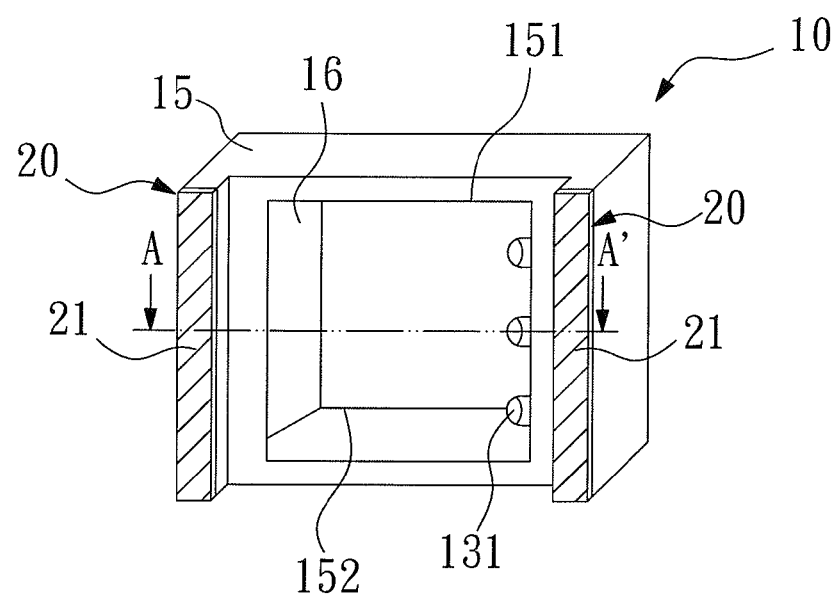
FIG. 8 is a perspective view of a second example of the third embodiment of the remote control device according to the present invention.
Figure 9:
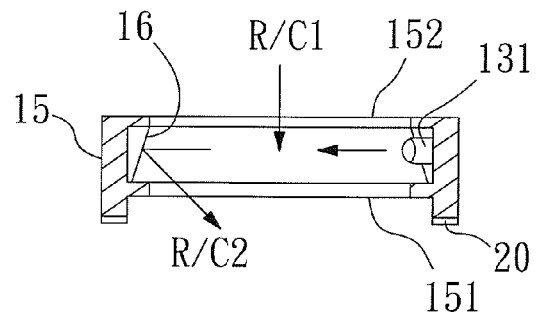
FIG. 9 is a cross sectional view taken along section line A-A' of FIG. 8.

FIGS. 7-9 show a third embodiment according to the present invention. The housing 15 further includes a transmission portion 152 opposite to the transmitting portion 151. The infrared LEDs 131 are mounted on an inner edge between the transmitting portion 151 and the transmission portion 152. Furthermore, the housing 15 includes a reflective plate 16 located between the transmitting portion 151 and the transmission portion 152. The reflective plate 16 reflects the infrared rays to a specific angular position such that the infrared rays can be reflected to the infrared reception end 31 of the electric appliance 30. The transmission portion 152 allows the rays R/C1 from an infrared controller for the electric appliance 30 to directly transmit through the transmission portion 152. At the same time, the infrared rays R/C2 converted from the WiFi module or Bluetooth module can also be used.

Figure 10:
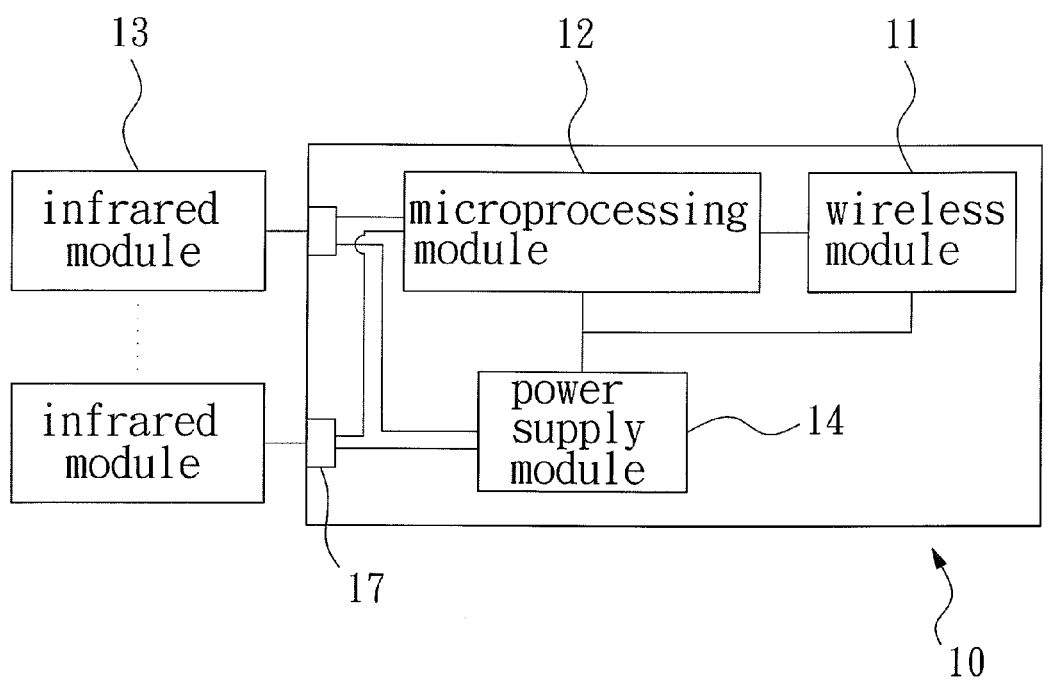
FIG. 10 a schematic block diagram of a fourth embodiment of the remote control apparatus according to the present invention.
Figure 11:
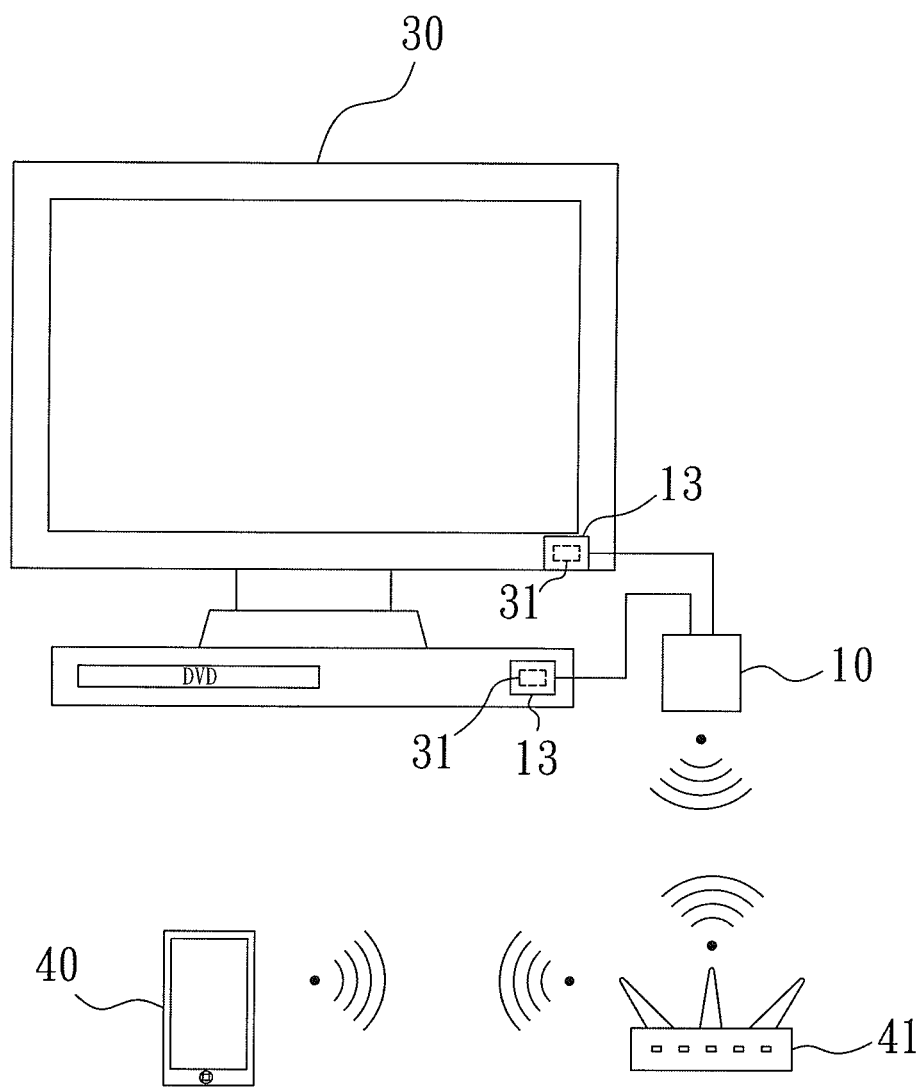
FIG. 11 is a schematic view illustrating operation of the remote control apparatus of FIG. 10.

FIGS. 10-11 show a fourth embodiment of the present invention. The housing 15 receives the wireless module 11, the microprocessing module 12, and the power supply module 13. The microprocessing module 12 includes a plurality of connections located on appropriate locations of the housing 15. Each connection 17 is connected to one of a plurality of infrared modules 13. Thus, if a plurality of electric appliances 30 is used in the same environment, the user can simply increase the number of infrared modules 13 and can mount them to the electric appliances 30, respectively. Then, the infrared modules 13 are connected to the connections 17. In use, remote control of the desired electric appliance 30 can be performed after the wireless module 11 is connected and after selecting the electric appliance 30 to be controlled. When it is desired to control another electric appliance 30, the handheld device 40 can be operated to switch to the next electric appliance 30 to be controlled, accomplishing remote control of many electric appliances 30. In installation, the locations of the electric appliances 30 and the relative positions of the electric appliances 30 and the respective infrared reception ends 31 are no longer problems. The obstacles between the infrared modules 13 and the infrared reception ends 31 of the electric appliances 30 are not problems, either. The use convenience is, thus, significantly increased.

When a user intends to use the remote control apparatus 10 of the present invention, the user can turn on build-in programs in the handheld device 40 or download application programs, such as app, for opening a corresponding control interface, such as Bluetooth. Then, the handheld device 40 is connected with the wireless module 11 of the remote control apparatus 10. After connection, the electric appliance corresponding to the remote control apparatus 10 can be selected, and a wireless control signal can be sent out via the user interface (the control interface) on the handheld device 40. Taking a television as an example, the control signal can be used to control the volume, channel, and frequency. The wireless control signal received by the wireless module 11 is transmitted to the microprocessing module 12. The microprocessing module 12 converts the wireless control signal into an infrared control signal and send the infrared control signal to the infrared reception end 31 of the electric appliance 30 via the infrared module 13. The microprocessing module 12 can read or store signal commands or programs corresponding to various electric appliances 30. Furthermore, the remote control apparatus 10 according to the present invention can be connected to a WiFi wireless network station 41 in home through networks. The wireless control signal from the handheld device 40 can be transmitted through the wireless network station 41, achieving a wireless signal control effect without distance limitations.

Although specific embodiments have been illustrated and described, numerous modifications and variations are still possible without departing from the scope of the invention. The scope of the invention is limited by the accompanying claims.

The invention claimed is:

1. A remote control apparatus for providing infrared remote control through a wireless signal, with the remote control apparatus comprising: a wireless module, a microprocessing module, an infrared module, a power supply module, and a housing receiving the wireless module, the microprocessing module, and the infrared module, with the wireless module, the microprocessing module, and the infrared module electrically connected to each other in series, with the power supply module electrically connected to and supplying electricity to the wireless module, the microprocessing module, and the infrared module, with the housing adapted to be located in a position outside of an electric appliance and corresponding to an infrared reception end of the electric appliance, with the wireless module adapted to be connected to a handheld device and adapted to receive a wireless control signal from the handheld device, with the wireless module transmitting the wireless control signal to the microprocessing module, with the microprocessing module unit converting the remote control signal into an enabling signal and sending the enabling signal to the infrared module, with the infrared module transmitting an infrared control signal to the infrared reception end of the electric appliance upon reception of the enabling signal, with the housing pivotably mounted to a fixing portion by a pivot, with the fixing portion adapted to be fixed to the electric appliance, and with the housing pivotable relative to the infrared reception end of the electric appliance.

2. The remote control apparatus as claimed in claim 1, with the wireless module being a Bluetooth module or a wireless fidelity module.

3. The remote control apparatus as claimed in claim 1, with the power supply module being a battery or receiving power from an external power source.

4. The remote control apparatus as claimed in claim 1, with the housing including an end having a transmitting portion, with the transmitting portion including an opening, and with the infrared module mounted in the opening.

5. The remote control apparatus as claimed in claim 1, with the infrared module including a plurality of infrared LEDs.

6. The remote control apparatus as claimed in claim 1, with the housing aligned with the infrared reception end of the electric appliance.

7. The remote control apparatus as claimed in claim 1, with the housing further including a transmission portion opposite to the transmitting portion.

8. The remote control apparatus as claimed in claim 7, with the housing including a reflective plate located between the transmitting portion and the transmission portion.

9. The remote control apparatus as claimed in claim 1, further comprising: a plurality second infrared modules, with the microprocessing module including a plurality of connections located on the housing, and with each of the plurality of connections connected to one of the infrared module and the plurality of second infrared modules.

* * * * *